United States Patent [19]

Ishikawa

[11] Patent Number: 5,372,432
[45] Date of Patent: Dec. 13, 1994

[54] DYNAMIC PRESSURE BEARING ASSEMBLY

[75] Inventor: Ryuhei Ishikawa, Tokyo, Japan
[73] Assignee: Nippon Ferrofluidics Corporation, Tokyo, Japan
[21] Appl. No.: 92,431
[22] Filed: Jul. 16, 1993
[51] Int. Cl.$^5$ .............................................. F16C 33/74
[52] U.S. Cl. ..................... 384/133; 384/107; 384/138
[58] Field of Search ............. 384/135, 138, 107, 478, 384/448, 112

[56] References Cited

U.S. PATENT DOCUMENTS

| | | | |
|---|---|---|---|
| 4,598,914 | 7/1986 | Furumura et al. | 384/133 |
| 4,938,611 | 7/1990 | Nü et al. | 384/133 |
| 5,059,039 | 10/1991 | Adolfsson | 384/133 |
| 5,161,900 | 11/1992 | Bougathou et al. | 384/133 |

Primary Examiner—Lenard A. Footland
Attorney, Agent, or Firm—Armstrong, Westerman, Hattori, McLeland & Naughton

[57] ABSTRACT

A dynamic pressure bearing with a magnetic fluid sealed therein is reduced in size without degrading the bearing performance and includes a sleeve 5 having an insertion hole 6 axially formed therein fixed in a housing 1, and a pair of pole pieces 9a, 9b disposed with clearances defined between the opposed surfaces of the sleeve 5 and the housing 1. A shaft 7 is inserted in and fixed to the pole pieces 9a, 9b, and is disposed in the insertion hole 6 with a clearance defined therebetween, and a magnetic fluid 15 is sealed in these clearances, thus forming a dynamic pressure bearing assembly. The sleeve 5 is made of nonmagnetic material while the housing 1, shaft 7 and pole pieces 9a, 9b are made of magnetic material. A permanent magnet 2 is interposed therebetween to form magnetic fields in the clearances between the housing 1 and the pole pieces 9a, 9b, thus sealing the magnetic fluid 15 therein.

1 Claim, 2 Drawing Sheets

DYNAMIC PRESSURE BEARING ASSEMBLY

BACKGROUND OF THE INVENTION

1. Field of Industrial Applicability

This invention relates to a dynamic pressure bearing assembly, particularly to a dynamic pressure bearing assembly having a magnetic fluid sealed therein.

2. Prior Art

A conventional dynamic pressure bearing assembly, as shown in FIGS. 2 and 3, comprises a bearing section and a seal section. First, the bearing section will be described. A sleeve 53 is fitted in a cylindrical housing 51 and fixed to the inner surface 52 thereof. The sleeve 53 is formed with an insertion hole 54 axially extending therethrough, and a shaft 55 is inserted in said insertion hole 54 with a clearance 57 defined therebetween to allow rotation of said shaft 55. A pair of thrust members 56a, 56b are disposed above and below the upper and lower surfaces of the sleeve 53 with clearance 58a, 58b defined therebetween. The thrust members 56a, 56b have an outer diameter which is smaller than the inner diameter of the housing 51, the thrust members being fixed on the shaft 55. The clearance 57 is filled with a magnetic fluid 64, and the inner peripheral surface of said insertion hole 54 and outer peripheral surface of the shaft 55 are finished to ensure that a dynamic pressure is produced in the magnetic fluid 64 by the rotation of the shaft 55. Similarly, the clearances 58a, 58b are filled with the magnetic fluid 64, and the upper surface of the thrust member 56b are finished to ensure that a dynamic pressure is produced in the magnetic fluid 56 by the rotation of the thrust members 56a, 56b. Thus, when the shaft 55 and thrust members 56a, 56b are rotated, a dynamic pressure is produced in the magnetic fluid 64 sealed in the clearances 57, 58a and 58b, acting on the shaft 55 and thrust members 56a, 56b. In this case, the radial load on the shaft 55 is directly supported by the sleeve 53, and the thrust load is supported by the sleeve 53 through the thrust members 56a, 56b.

The seal section will now be described. Associated with the upper and lower surfaces of the thrust members 56a, 56b are permanent magnets 60a, 60b and pole pieces 61a, 61b, which are integrally fitted in the housing 51 and fixed to the inner surface 52 thereof. The pole pieces 61a, 61b have an inner diameter which is smaller than that of the permanent magnets 60a, 60b and their inner surfaces are tapered, with clearances 62a, 62b defined between said inner surfaces and the outer peripheral surface of the shaft 55. Further, the permanent magnets 60a, 60b are axially magnetized. That is, as shown in FIG. 3, magnetic circuits 63 are formed in which the magnetic flux flows from the permanent magnets 60a, 60b successively through the pole pieces 61a, 61b successively through the pole pieces 61a, 61b, shaft 55, and thrust members 56a, 56b and back to the permanent magnets 60a, 60b, producing magnetic fields in the clearances 62a, 62b. Therefore, the magnetic fluid 64 is sealed between the clearances 62a and 62b.

However, since the seal and bearing sections of said dynamic pressure bearing assembly are composed of independent separate members, they require an axial space, which increases the overall size. To decrease the size, the sleeve length has to be decreased. Thus, this requirement cannot be satisfied without degrading the bearing performance.

SUMMARY OF THE INVENTION

This invention, which has been accomplished to eliminate this drawback, is intended to provide a dynamic pressure bearing assembly which can be minimized in size without degrading the bearing performance.

A dynamic pressure bearing assembly according to this invention includes a sleeve 5 having an insertion hole 6 axially formed therein, a cylindrical housing 1, sleeve 5 being fixed to the inner peripheral surface of housing 1, a pair of pole pieces 9a, 9b disposed with clearances 10a, 10b defined between pole pieces 9a, 9b and the opposed surfaces of sleeve 5, a shaft 7, smaller in diameter than said insertion hole 6, shaft 7 being inserted in and fixed to the pair of pole pieces 9a, 9b, with a clearance 8 defined between shaft 7 and insertion hole 6 and a magnetic fluid 15 sealed in clearances 8, 10a, 10b, 11a, 11b, the radial load being supported by the inner peripheral surface of insertion hole 6 and the thrust load being supported by the opposed surfaces of the sleeve 5 through the pair of pole pieces 9a, 9b. Said dynamic pressure bearing assembly is characterized in that the housing 1, shaft 7 and pair of pole pieces 9a, 9b are made of magnetic material, while the sleeve 5 is made of nonmagnetic material. A permanent magnet 2 is disposed in passages extending from the housing 1 successively through one pole pieces 9a, shaft 7, and the other pole piece 9b and back to the housing 1, with magnetic circuits 21 defined in the passage. Magnetic circuits 21 produces magnetic fields in the clearances 11a, 11b between the housing 1 and the pole pieces 9a, 9b, thereby sealing the magnetic fluid 15 therein.

In the dynamic pressure bearing assembly described above, when the shaft 7 and pole pieces 9a, 9b or the housing 1 and sleeve 5 are rotated, the sleeve 5 supports the radial load, while the pole pieces 9a, 9b cooperate with the sleeve 5 to support the thrust load. Thus, the pole pieces 9a, 9b function as parts of the bearing section.

Further, the pole pieces 9a, 9b form portions of the magnetic circuits 21. The magnetic fluid 15 is sealed by the magnetic fields produced in the clearances 11a, 11b between the housing 1 and the pole pieces 9a, 9b. Thus, as in the prior art, they also function as parts of the seal section.

DESCRIPTION OF THE PREFERRED EMBODIMENTS

Figure 1:
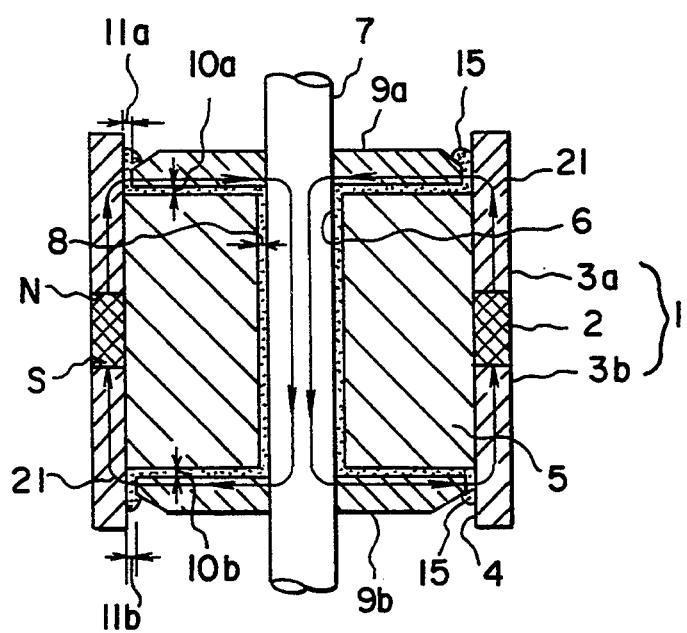
FIG. 1 is a longitudinal sectional view showing an embodiment of a dynamic pressure bearing assembly according to this invention.
Figure 2:
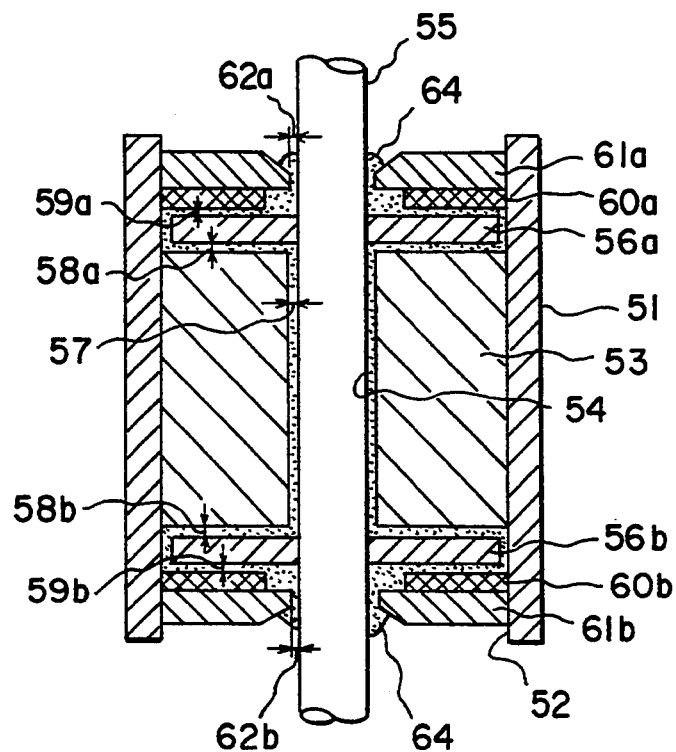
FIG. 2 is a longitudinal sectional view showing a prior art example.
Figure 3:
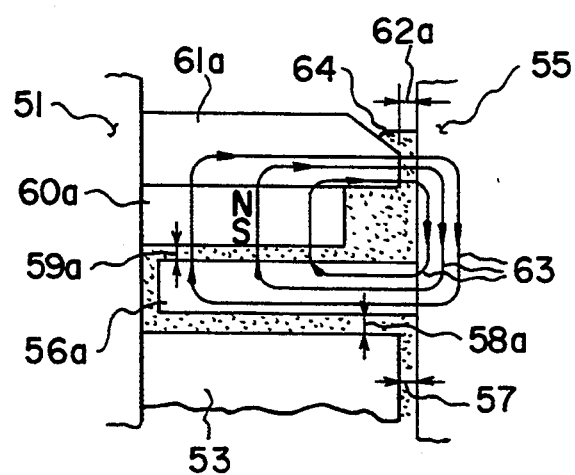
FIG. 3 is a fragmentary enlarged sectional view showing a magnetic circuit in the prior art example of FIG. 2.

An embodiment of a dynamic pressure bearing assembly according to this invention will now be described with reference to the drawings in which FIG. 1 is a longitudinal sectional view showing an embodiment of this invention. In FIG. 1, the numeral 1 denotes a cylindrical housing comprising a cylindrical permanent magnet 2 and a pair of cylindrical members 3a, 3b. The permanent magnet 2 is made of barium ferrite, rare earth cobalt, or like material and is axially magnetized in such a manner as to have an N-pole at its upper end, with the cylindrical members 3a, 3b joined to the upper and lower ends thereof. The numeral 5 denotes a sleeve of nonmagnetic material, inserted in housing 1 and fixed to the inner surface 4 thereof and having an insertion hole 6 axially formed therein. The numeral 7 denotes a shaft of nonmagnetic material. This shaft 7 is smaller in diameter than the insertion hole 6, with a clearance 8 defined between the inner peripheral surface of the insertion hole 6 and the outer peripheral surface of the shaft 7. A pair of pole pieces 9a, 9b of magnetic material are disposed in housing 1 in such a manner as to provide clearances 10a, 10b at the upper and lower surfaces of the sleeve 51 are fixed to shaft 7. In addition, pole pieces 9a, 9b have a diameter such that there are clearances 11a, 11b between pole pieces 9a, 9b and the inner peripheral surface 4 of housing 1, the outer peripheral ends of pole pieces 9a, 9b being tapered.

The clearances 8, 10a, 10b have a magnetic fluid 15 sealed therein. The respective surfaces which define clearances 8, 10a, 10b, i.e., the inner peripheral surface of insertion hole 6, the lower surface of upper pole pieces 9a, the upper surface of lower pole pieces 9b, and the upper and lower surfaces of sleeve 5 are finished to ensure that a dynamic pressure is produced in magnetic fluid 15 by the rotation of shaft 7 and pole pieces 9a, 9b. This arrangement forms a bearing section in which the radial load acting on the shaft 7 is supported by the sleeve 5 and the thrust load is supported by the sleeve 5 through the pole pieces 9a, 9b.

Pole pieces 9a, 9b also form a seal section. More particularly, permanent magnet 2 forms magnetic circuits 21 extending successively through upper cylindrical member 3a, upper pole piece 9a, shaft 7, lower pole piece 9b, and lower cylindrical member 3b and back to permanent magnet 2, producing magnetic fields in clearances 11a, 11b, with the magnetic fluid 15 sealed in clearances 11a, 11b. In this case, the outer ends of pole pieces 9a, 9b are tapered to increase the magnetic flux density and improve the seal performance. In addition, the magnetic fluid 15 is a stable dispersion, having suspended therein ferromagnetic metal particles of tens of Angstroms and having the feature that, even if it is subjected to magnetic field or centrifugal force, its density is maintained unchanged.

In the assembly thus arranged, when the shaft 7 and pole pieces 9a, 9b are rotated, a dynamic pressure is produced in the magnetic fluid 15 sealed in the clearances 8, 10a, 10b, such dynamic pressure acting on the sleeve 5, shaft 7 and pole pieces 9a, 9b. In this case, the radial load on the shaft 7 is supported by the sleeve 5, and the axial thrust load is supported by the sleeve 5 through the pole pieces 9a, 9b.

The cylindrical permanent magnet 2 is joined to the housing 1. The pair of cylindrical members 3a, 3b, shaft 7 and pair of pole pieces 9a, 9b are made of magnetic material, while the sleeve 5 is made of nonmagnetic material. The permanent magnet 2 is axially magnetized. Therefore, the magnetic circuits 21, extending successively through the upper cylindrical member 3a, upper pole piece 9a, shaft 7, lower pole piece 9b, and lower cylindrical member 3b and back to the permanent magnet 2, is formed. As a result, it becomes possible to reduce the number of components of the assembly to minimize the assembly without degrading the bearing performance.

A dynamic pressure bearing assembly according to an embodiment of this invention has been described so far, but the invention is not limited thereto and can be embodied in various forms within the scope of the invention. For example, in the above embodiment, the shaft 7 and pole pieces 9a, 9b are rotatable, but it goes, without saying, that the housing 1 and sleeve 5 may be rotated. Further, the permanent magnet 2 has been shown held in the housing 1. It may be positioned in the pole piece 9a or 9b or shaft 7, and in a portion or the whole thereof. Further, the pole pieces 9a, 9b have been disposed in such a manner as to create clearances 11a, 11b between them end the inner peripheral surface 4 of the housing 1, but the outer diameter of the pole pieces 9a, 9b may be made the same as that of the housing 1 while forming clearances 11a, 11b between the lateral end surfaces of the housing 1 and the upper and lower front end surfaces of the pole pieces 9a, 9b.

As has been described in the dynamic pressure assembly, the pole pieces form the bearing section and also form the seal section as in the prior art; thus, the size of the prior art assembly can be minimized without degrading the bearing performance.

What is claimed is:

1. A dynamic pressure bearing assembly including a sleeve (5) having an insertion hole (6) axially formed therein, a cylindrical housing 1, said sleeve being fixed to the inner peripheral surface of said housing, a pair of pole pieces (9a, 9b) disposed with clearances (10a, 10b) defined between said pole pieces and the opposed surfaces of said sleeve (5), a shaft (7) smaller in diameter than said insertion hole (6), said shaft being inserted in and fixed to said pair of pole pieces (9a, 9b), with a clearance (8) defined between said shaft (7) and said insertion hole 6, a magnetic fluid sealed in said clearances (8, 10a, 10b, 11a, 11b), the radial load of said shaft being supported by the inner peripheral surface of said insertion hole (6), the thrust load of said shaft being supported by the opposed surfaces of said sleeve (5) through said pair of pole pieces (9a, 9b), said dynamic pressure bearing assembly being characterized in that the housing (1), shaft (7) and pair of pole pieces (9a, 9b) are made of magnetic material, while the sleeve (5) is made of nonmagnetic material, and that a permanent magnet (2) is disposed in passages extending from said housing (1) successively through one of said pole pieces, shaft (7), and the other of said pole pieces and back to said housing (1), with magnetic circuits (21) defined in said passages, said magnetic circuits (21) producing magnetic fields in the clearances (11a, 11b) between said housing (1) and said pole pieces (a, 9b), thereby sealing said magnetic fluid (15) therein.

* * * * *